(12) United States Patent
Hauser et al.

(10) Patent No.: US 11,987,294 B2
(45) Date of Patent: May 21, 2024

(54) TWIST PREVENTION OF THE RACK BY COMPLEMENTARY SHAPES

(71) Applicant: Robert Bosch GmbH, Stuttgart (DE)

(72) Inventors: Bernd Hauser, Steinheim (DE); Juergen Hoersch, Gschwend (DE); Johannes Hein, Munich (DE); Matthias Buerckert, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 645 days.

(21) Appl. No.: 17/269,181

(22) PCT Filed: Jul. 22, 2019

(86) PCT No.: PCT/EP2019/069612
§ 371 (c)(1),
(2) Date: Feb. 17, 2021

(87) PCT Pub. No.: WO2020/038672
PCT Pub. Date: Feb. 27, 2020

(65) Prior Publication Data
US 2021/0291891 A1    Sep. 23, 2021

(30) Foreign Application Priority Data
Aug. 21, 2018   (DE) .................... 10 2018 214 039.1

(51) Int. Cl.
*B62D 3/12*   (2006.01)
*B62D 5/04*   (2006.01)
(Continued)

(52) U.S. Cl.
CPC .......... *B62D 3/126* (2013.01); *B62D 5/0448* (2013.01); *F16C 29/002* (2013.01); *F16C 2326/24* (2013.01); *F16H 2019/046* (2013.01)

(58) Field of Classification Search
CPC ...................................... B62D 3/126
See application file for complete search history.

(56) References Cited

U.S. PATENT DOCUMENTS 9,969,422 B2 *   5/2018   Yamamoto ........... B62D 5/0424
10,562,559 B2 *   2/2020   Oikawa ..................... B62D 3/12
(Continued)

FOREIGN PATENT DOCUMENTS

CN    101663191 A    3/2010
CN    105480296 A    4/2016
(Continued)

OTHER PUBLICATIONS

International Search Report corresponding to PCT Application No. PCT/EP2019/069612, dated Nov. 7, 2019 (German and English language document) (6 pages).

*Primary Examiner* — Kevin Hurley
(74) *Attorney, Agent, or Firm* — Maginot, Moore & Beck LLP

(57) ABSTRACT

A steering system for steering a wheel of a vehicle includes a track rod for deflecting the wheel, a rack which, by axial movement, leads to control of the track rod, and a housing. The rack is at least partially arranged within the housing. The rack has a convex and/or concave cross-sectional portion. The housing-mounted complementary geometry includes a complementary concave and/or convex shaping, as a result of which a form-fitting connection is produced for realizing the twist prevention.

13 Claims, 5 Drawing Sheets

(51) Int. Cl.
*F16C 29/00* (2006.01)
*F16H 19/04* (2006.01)

(56) References Cited

U.S. PATENT DOCUMENTS

| | | | | |
|---|---|---|---|---|
| 2008/0217094 A1 * | 9/2008 | Crossman | ............ | F16C 17/024 |
| | | | | 180/428 |
| 2017/0158221 A1 | 6/2017 | Yamamoto | | |

FOREIGN PATENT DOCUMENTS

| | | | | |
|---|---|---|---|---|
| DE | 26 29 686 A1 | 1/1977 | | |
| DE | 43 34 491 A1 | 4/1995 | | |
| DE | 19854681 A1 * | 5/2000 | ............ | B62D 3/123 |
| DE | 199 37 376 A1 | 2/2001 | | |
| DE | 10 2008 002 176 A1 | 12/2009 | | |
| DE | 10 2012 108 423 A1 | 3/2014 | | |
| DE | 102012108423 A1 * | 3/2014 | ............ | B62D 3/123 |
| DE | 10 2014 000 815 A1 | 7/2015 | | |
| DE | 10 2016 123 148 A1 | 6/2017 | | |
| EP | 1571066 A2 * | 9/2005 | ............ | B62D 3/123 |
| GB | 2035507 A * | 6/1980 | ............ | B62D 3/126 |
| JP | 2001-278076 A | 10/2001 | | |
| JP | 2004-205332 A | 7/2004 | | |
| JP | 2005-319899 A | 11/2005 | | |
| JP | 2006-151391 A | 6/2006 | | |
| JP | 2008-074260 A | 4/2008 | | |
| JP | 2011255834 A * | 12/2011 | | |
| JP | 2012-245810 A | 12/2012 | | |
| JP | 2014151833 A * | 8/2014 | | |
| JP | 2016-185783 A | 10/2016 | | |
| JP | 2018-122667 A | 8/2018 | | |

* cited by examiner

TWIST PREVENTION OF THE RACK BY COMPLEMENTARY SHAPES

This application is a 35 U.S.C. § 371 National Stage Application of PCT/EP2019/069612, filed on Jul. 22, 2019, which claims the benefit of priority to Serial No. DE 10 2018 214 039.1, filed on Aug. 21, 2018 in Germany, the disclosures of which are incorporated herein by reference in their entirety.

The present disclosure relates to a steering system and a vehicle.

BACKGROUND

In the prior art, rack-and-pinion arrangements and ball screw drives are known as part of a steering system.

SUMMARY

The term "toothed rack" is synonymously understood to be a steering rod. A toothed rack is axially displaceable, wherein it can turn wheels of vehicles which are articulated via tie rods.

A steering with a ball screw drive has the disadvantage that, in contrast to steering with a rack-and-pinion arrangement, there is no inherent torsion prevention of the toothed rack. A torsion prevention is necessary for the function of the ball screw drive. If with a steering, for example, a steer-by-wire steering system, there is only a ball screw drive for applying the steering torque, an additional torsion prevention member therefore has to be arranged.

In a conventional steering system having a worm gear mechanism using a rack-and-pinion arrangement, there is automatically produced a torsion prevention of the relevant toothed rack since generally a pressure piece which is arranged opposite the pinion ensures that the toothed rack is pressed with its tooth arrangement against the tooth arrangement of the pinion and consequently there is a lack of play with respect to torsion of the toothed rack. Even without a pressure piece, torsion is only provided in the context of the flank play between the tooth arrangement partners, pinion and toothed rack. With a steer-by-wire steering system with a ball screw drive, such torsion prevention is not provided since in this instance the steering gear in the form of a rack-and-pinion tooth arrangement is omitted.

An objective is therefore to provide a steering system for a "steer-by-wire" concept with a ball screw drive which enables torsion prevention.

As a first embodiment of the disclosure, a steering system for steering a wheel of a vehicle is provided, comprising: a tie rod for redirecting the wheel, a toothed rack which, as a result of an axial displacement, leads to control of the tie rod, and a housing, wherein the toothed rack is arranged at least partially inside the housing, wherein the toothed rack has a convex and/or concave cross-section portion, wherein the complementary geometry which is fixed to the housing comprises a complementary concave and/or convex formation, whereby a positive-locking connection is produced in order to produce a torsion prevention.

As a result of corresponding forms of the toothed rack with respect to the housing thereof, for example, in a clover-leaf-like profile, a torsion prevention of the toothed rack within the housing can be ensured.

As a second embodiment of the disclosure, a vehicle is provided, wherein the vehicle has a steering system according to various aspects described below.

Exemplary embodiments are described in the dependent claims.

According to an exemplary embodiment of the disclosure, a steering system is provided, wherein an intermediate element is arranged between the housing and toothed rack in order to ensure a low-friction and low-wear sliding friction, fitting precision and a lack of play or play freedom.

According to another embodiment of the present disclosure, a steering system is provided, wherein an insertion bush which is connected to the housing is provided between the housing and intermediate element.

In another embodiment according to the disclosure, a steering system is provided, wherein the intermediate element is constructed integrally with the housing or integrally with the insertion bush or integrally with the toothed rack.

As a result of the integral nature, a simplified assembly of the steering is provided.

According to another embodiment of the present disclosure, a steering system is provided, wherein the intermediate element is injected or placed between the housing and toothed rack.

A simple assembly method is thereby produced.

According to an exemplary embodiment of the disclosure, a steering system is provided, wherein the intermediate element has in a radial and/or in an axial direction a wave form, in particular a sinusoidal wave form.

As a result of a sinusoidal configuration of the intermediate element, a simplified production of the intermediate element is possible.

In another embodiment according to the disclosure, a steering system is provided, wherein the steering system is suitable for highly autonomous driving.

According to another embodiment of the present disclosure, a steering system is provided, wherein the steering system is suitable for steer-by-wire and/or wherein the steering system is suitable as a rear-axle steering system.

In another embodiment according to the disclosure, a steering system is provided, wherein a metal protuberance of the housing or the toothed rack protrudes into a suitable metal recess of the toothed rack or the housing.

As a result of a metal projection which protrudes into a complementary recess, an emergency torsion prevention can be produced.

It can be considered to be a notion of the disclosure to provide a steering system in which the toothed rack has a contour such that, as a result of a positive-locking connection to the cover of the toothed rack, that is to say, the housing thereof, torsion of the toothed rack can be excluded.

The individual features can of course also be combined with each other, whereby advantageous effects which extend beyond the sum of the individual effects may also be produced in some cases.

BRIEF DESCRIPTION OF THE DRAWINGS

Further details and advantages of the disclosure will become clear with reference to the embodiments illustrated in the drawings, in which.

DETAILED DESCRIPTION

Figure 1:
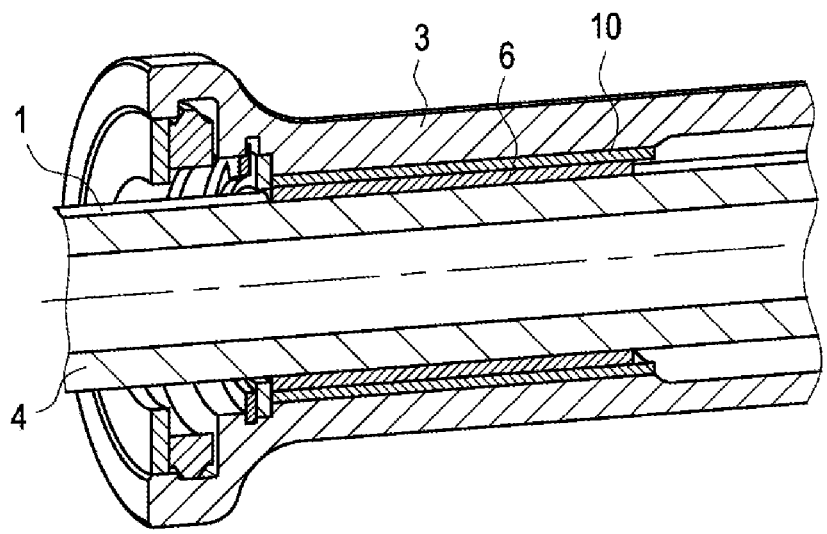
FIG. 1 is a perspective cross-section of a toothed rack 4 in a housing 3.

FIG. 1 shows a longitudinal section of the toothed rack 4 with the housing 3, wherein there is arranged between the housing 3 and the toothed rack 4 an intermediate element 6 which enables better tribological behavior between the toothed rack 4 and the housing 3, whereby the friction and the wear are thus reduced. The insertion bush 10 illustrated is alternatively provided and associated with the housing 3. Using this insertion bush 10, the assembly and/or the securing of the intermediate element 6 on the housing 3 can be facilitated. Alternatively, the intermediate element 6 can also be securely connected to the toothed rack 4, wherein in this instance the sliding movement between the housing 3 and/or the insertion bush 10, which is secured to the housing, and the intermediate element 6 is carried out.

Figure 2:
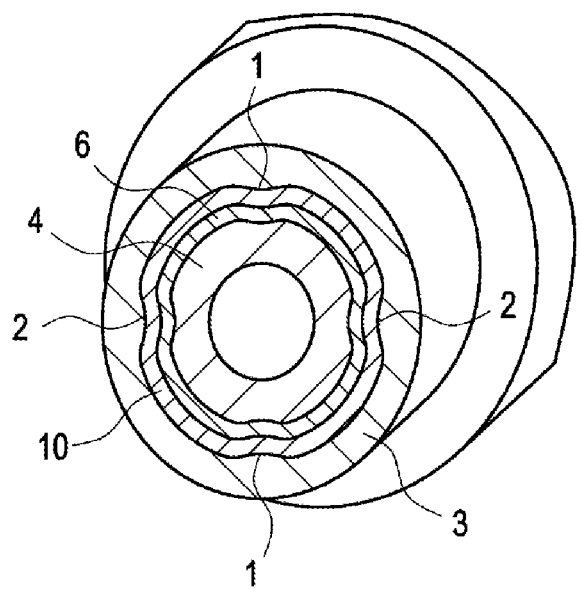
FIG. 2 is a perspective cross-section of the toothed rack 4 in the housing 3.

FIG. 2 is a cross-section of the toothed rack 4, wherein an intermediate element 6 is arranged between the toothed rack 4 and the housing 3. In particular, an outer contour of the toothed rack 4 and an inner contour of the housing 2 may be present in such a manner that a positive-locking configuration is achieved and leads to a torsion prevention. Between the toothed rack 4 and the housing 3, there may be arranged an intermediate element 6 which is securely connected to the housing 3 and which ensures low-friction sliding friction with little wear between the toothed rack 4 and the housing 3. An insertion bush 10 which is securely connected to the housing 3 may additionally be arranged between the housing 3 and intermediate element 6. A complementary inner and outer contour pairing may, for example, be present as a projection/recess pairing.

Figure 3:
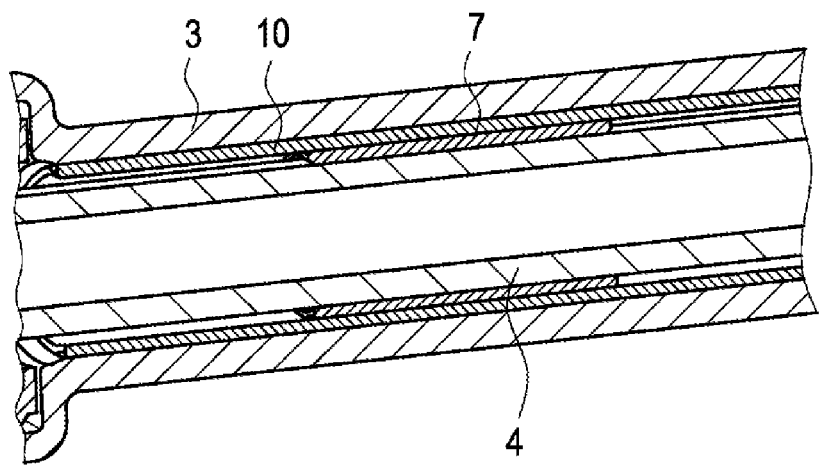
FIG. 3 is a perspective cross-section of another portion of the toothed rack 4 in a housing 3.

FIG. 3 is a longitudinal section with an intermediate element 7 which is securely connected to the toothed rack 4. In this embodiment, an insertion bush 10 which is secured to the housing is also further provided. The sliding movement takes place in this instance between the housing 3 or insertion bush 10 and the intermediate element 7.

Figure 4:
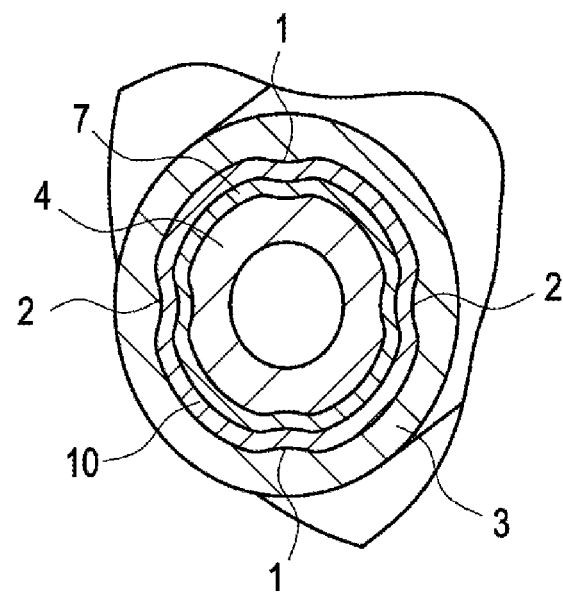
FIG. 4 is another perspective cross-section of the toothed rack 4 in a housing 3.

FIG. 4 is a cross-section with a toothed rack 4 to which the intermediate element 7 is securely connected. The speed separation or the sliding movement takes place in this instance between the housing 3 or the insertion bush 10 and the intermediate element 7.

Figure 5:
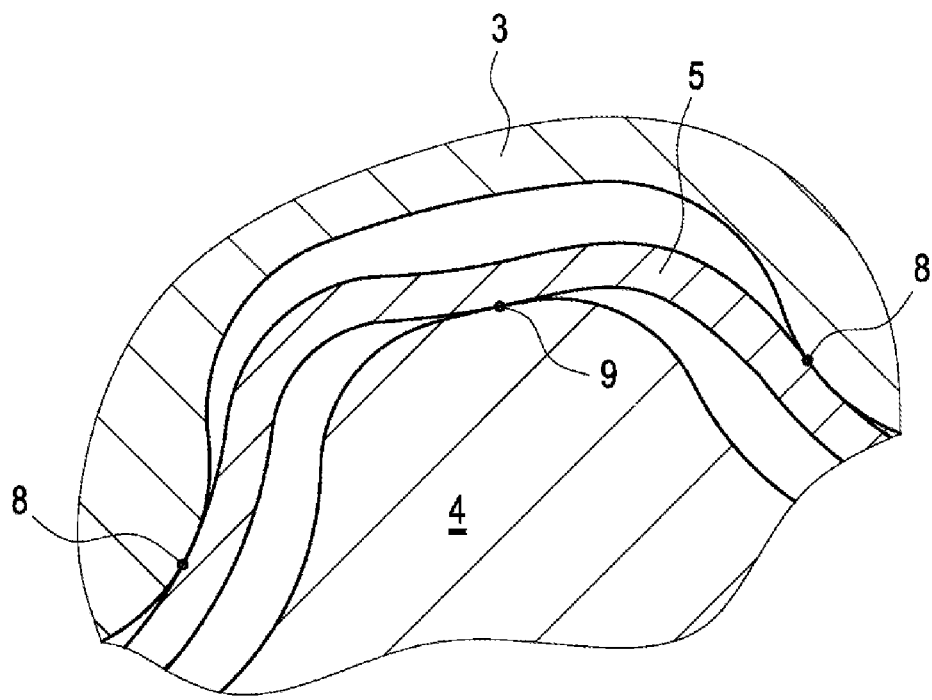
FIG. 5 is another schematic cross-section of the toothed rack 4 in a housing 3 and an intermediate element 5, for example, with a wave form.

FIG. 5 shows an intermediate element 5 which is characterized by a specific contour in a radial direction, whereby at specially selected locations contact locations with the toothed rack 9 or the housing 8 are produced.

Figure 6:
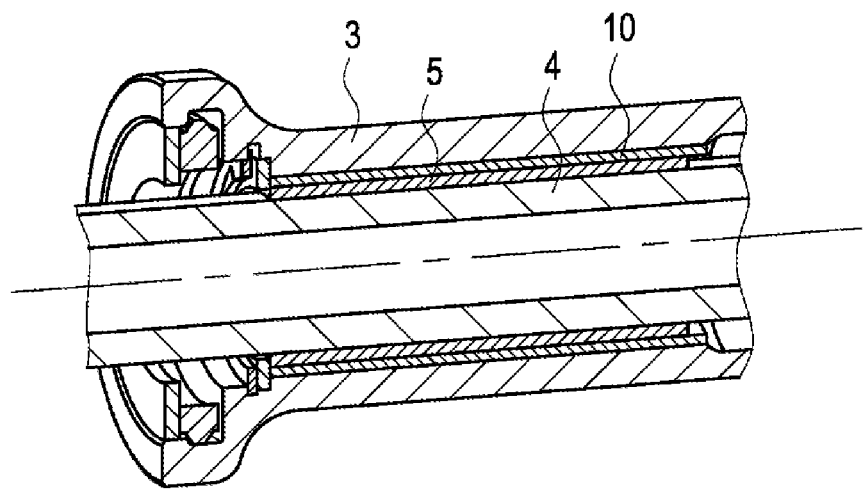
FIG. 6 is another perspective longitudinal section through the toothed rack 4 with a housing 3.

FIG. 6 shows a longitudinal section with a toothed rack 4, wherein an intermediate element 5 for sliding friction and torsion prevention is arranged between the toothed rack 4 and housing 3.

Figure 7:
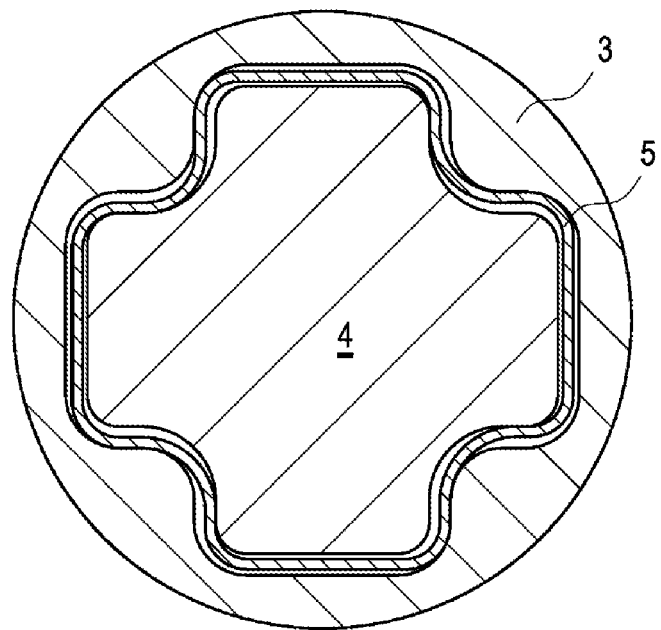
FIG. 7 is a cross-section with the toothed rack 4 and the housing 3, wherein an intermediate element 5 with a cloverleaf-like profile is arranged between the toothed rack 4 and the housing 3.

FIG. 7 shows the intermediate element 5 which is placed between the toothed rack 4 and the housing 3. The intermediate element 5 is tensioned in such a manner that at specially selected contact locations a contact with the toothed rack 4 or the housing 3 is produced.

Figure 8:
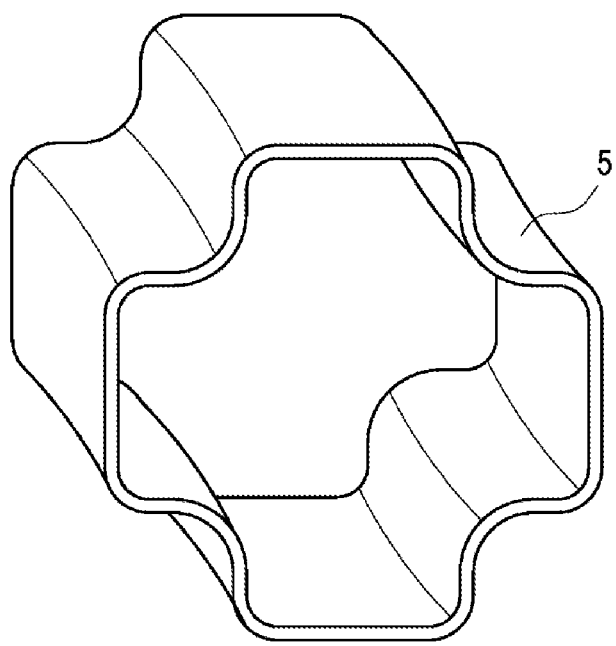
FIG. 8 shows the intermediate element 5.

FIG. 8 shows the intermediate element 5, wherein it can assume in a radial and axial orientation a specific wave shape in order to ensure appropriate contacts with the toothed rack and housing.

Figure 9:
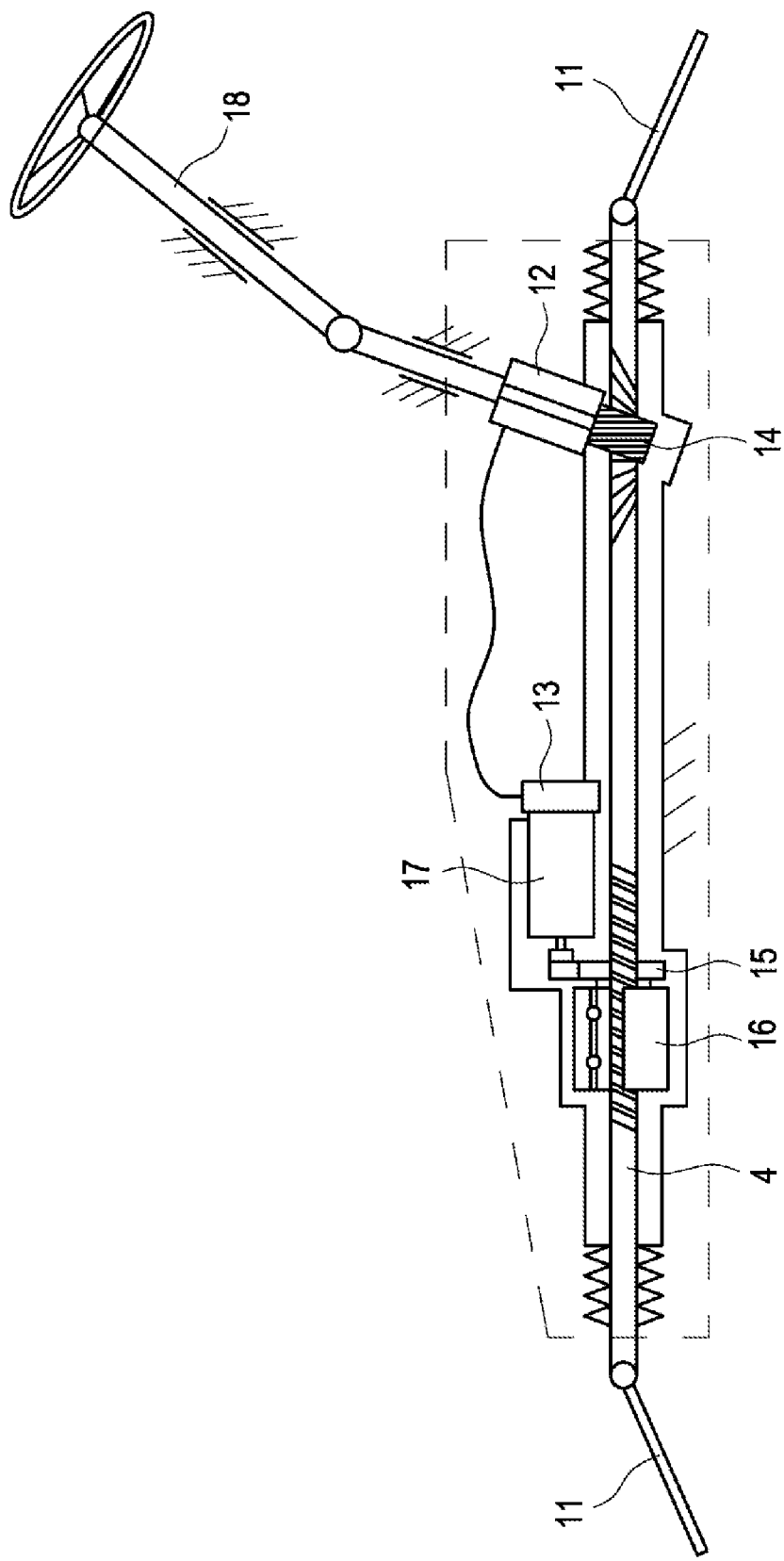
FIG. 9 is a schematic illustration of a steering system of a vehicle.

FIG. 9 is a schematic illustration of the steering system of a vehicle having the steering column 18, which leads by means of a pinion 14 to a movement of the toothed rack 4 along the longitudinal axis thereof. The rotation of the pinion 14 is detected by means of a torque sensor 12 and transmitted to a control device 13. The control device 13 controls the servo motor 17 in such a manner that a steering support is produced. The servo motor 17 drives a belt 15 which controls the ball screw drive 16.

In a conventional steering system having a mechanical through-drive, as a result of the rack-and-pinion connection the function of the torsion prevention of the toothed rack is automatically also provided currently. With alternative steering systems, for example, with a steer-by-wire steering based on the $EPS_{apa}$, without a mechanical through-drive, there is no rack-and-pinion connection. Since the function of the torsion prevention of the toothed rack is indispensable for the functionality of the ball screw drive, however, this has to be produced in another manner. According to the disclosure, the torsion prevention of the toothed rack is enabled by means of a positive-locking connection with a corresponding counter-contour of the housing of the toothed rack.

It should be noted that the term "comprise" does not exclude other elements or method steps, and the term "a" or "an" does not exclude a plurality of elements and steps.

The reference numerals used serve only to increase the comprehensibility and should in no way be considered to be limiting, wherein the protective scope of the disclosure is set out by the claims.

LIST OF REFERENCE NUMERALS

1 Groove
2 Groove
3 Housing
4 Toothed rack, axially displaceable
5 Intermediate element
6 Intermediate element
7 Intermediate element
8 Contact location with housing
9 Contact location with toothed rack
10 Insertion bush
11 Tie rod
12 Torque sensor
13 Control device
14 Pinion
15 Belt
16 Ball screw drive
17 Servo motor
18 Steering column

The invention claimed is:

1. A steering system for steering a wheel of a vehicle according to steer-by-wire principle or for autonomous driving, comprising:
a tie rod configured to redirect the wheel;
a toothed rack with a convex and/or concave cross-sectional portion;

a ball screw drive configured to act on the toothed rack, wherein the toothed rack, as a result of an axial displacement, is configured to lead to control of the tie rod;

a housing, wherein the toothed rack is arranged at least partially inside the housing; and a component, with a portion having complementary geometry to the convex and/or concave cross-sectional portion of the toothed rack, fixedly positioned with respect to the housing, wherein the complementary geometry portion of the component and the concave and/or convex cross-sectional portion of the toothed rack provide a positive-locking connection to produce a torsion prevention.

2. The steering system as claimed in claim 1, wherein the component fixedly positioned with respect to the housing is located directly in the housing.

3. The steering system as claimed in claim 1, wherein the component which is fixedly positioned with respect to the housing is constituted by an insertion bush which is connected to the housing.

4. The steering system as claimed in claim 3, further comprising an intermediate element arranged between the housing and the toothed rack.

5. The steering system as claimed in claim 4, wherein the insertion bush is connected to the housing, wherein the insertion brush is provided between the housing and the intermediate element.

6. The steering system as claimed in claim 4, wherein the intermediate element is constructed integrally with the housing or integrally with the insertion bush or integrally with the toothed rack.

7. The steering system as claimed in claim 4, wherein the intermediate element is injected or placed between the housing and toothed rack.

8. The steering system as claimed in claim 4, wherein the intermediate element has in a radial and/or in an axial direction a wave form.

9. The steering system as claimed in claim 1, wherein the steering system is configured to be a rear-axle steering system.

10. The steering system as claimed in claim 1, wherein a metal protuberance or recess of the housing protrudes into a suitable metal recess or protuberance of the toothed rack.

11. The steering system as claimed in claim 3, wherein a metal protuberance or recess of the insertion bush protrudes into a suitable metal recess or protuberance of the toothed rack.

12. A vehicle, wherein the vehicle has a steering system as claimed in claim 1.

13. The steering system as claimed in claim 8, wherein the intermediate element has in a radial and/or in an axial direction a sinusoidal wave form.

* * * * *